F. A. ROBERTS.
JOURNAL BOX.
APPLICATION FILED SEPT. 11, 1912.
1,112,936.
Patented Oct. 6, 1914.
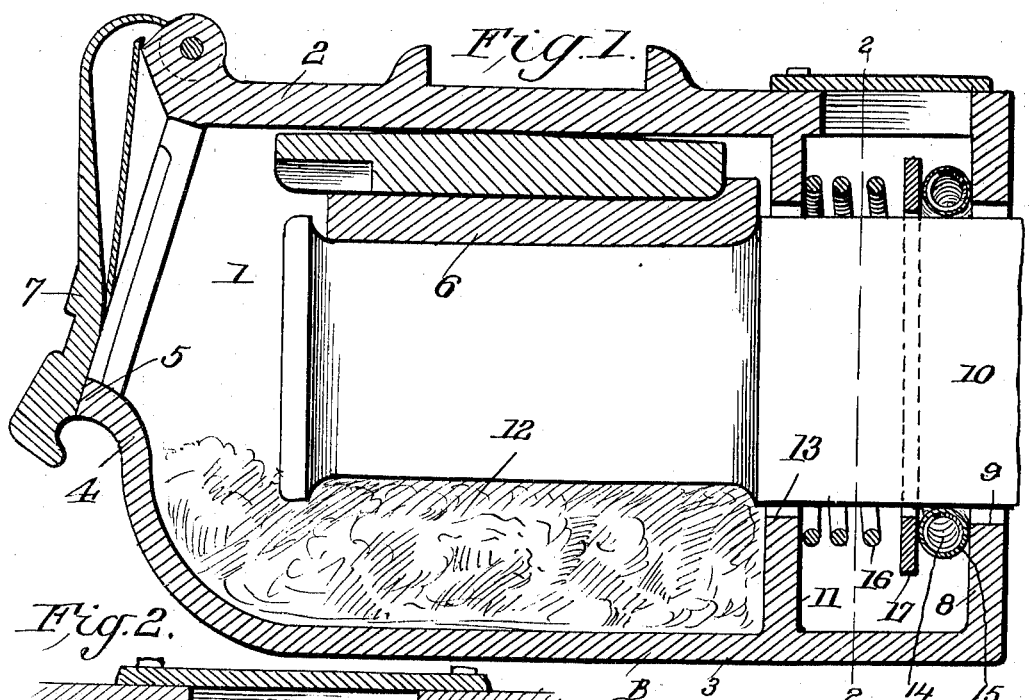
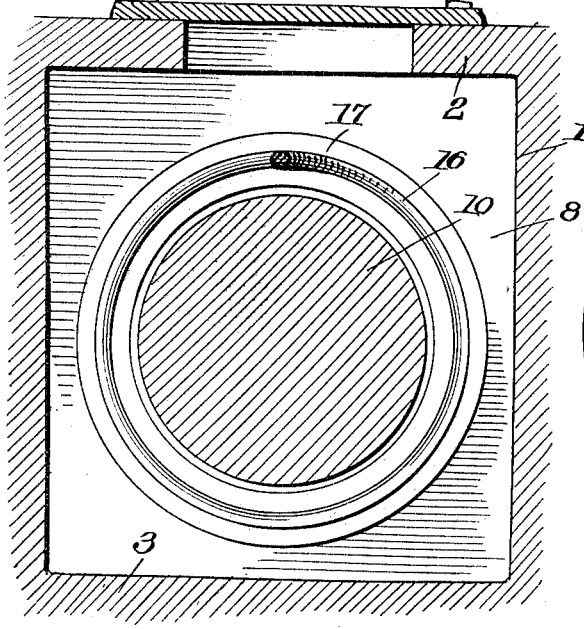
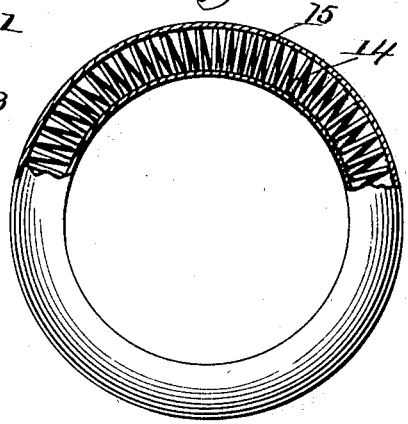
Inventor
F. A. Roberts
Witnesses

UNITED STATES PATENT OFFICE.

FREDRICK A. ROBERTS, OF DICKEY, NORTH DAKOTA.

JOURNAL-BOX.

1,112,936.  Specification of Letters Patent.  Patented Oct. 6, 1914.

Application filed September 11, 1912. Serial No. 719,836.

*To all whom it may concern:*

Be it known that I, FREDRICK A. ROBERTS, citizen of the United States, residing at Dickey, in the county of Lamoure and State of North Dakota, have invented certain new and useful Improvements in Journal-Boxes, of which the following is a specification.

This invention relates to car axle journal boxes and has for its object to provide a novel packing for such a box. It is a well-known fact that in the ordinary construction of car axle journal boxes the lubricant is liable to leak from the box around that portion of the journal which fits through the rear end of the box.

The present invention, therefore, aims to provide in a journal box of this type, a novel packing so constructed that the escape of lubricant from the box through the opening in the rear wall thereof will be positively prevented.

It is, of course, customary to arrange a washer or packing gasket upon the journal immediately inwardly of the rear wall of the journal box, but the ordinary forms of washer and gaskets are not suited for use in this connection for the reason that the walls of their openings soon become worn and the lubricant is allowed to leak from the box.

It is therefore, a further aim of the invention to provide a washer which will at all times snugly fit about the journal and, which will, as it becomes worn, contract so as to prevent leakage of the lubricant around the journal.

In the accompanying drawings, Figure 1 is a vertical, longitudinal, sectional view through a car axle journal box in which is arranged the packing embodying the present invention. Fig. 2 is a vertical transverse sectional view on the line 2—2 of Fig. 1. Fig. 3 is a view in elevation and partly in section of the washer removed from the journal.

In the drawing, the journal box is indicated in general by the reference character B and includes side walls 1, a top wall 2, and a forward wall 4 which is provided with the usual opening 5 for the insertion and removal of the brass, indicated in the drawing by the numeral 6. The open front of the box is closed by the usual lid 7. The rear wall of the box is indicated by the numeral 8 and is formed with an opening 9 through which is fitted the journal indicated at 10.

As is clearly shown in Fig. 1 of the drawings, the box is divided transversely by a partition 11 which is located in a plane parallel to the rear wall 8 of the box and it will also be observed from inspection of the said Fig. 1 that the brass 6 is located within the forward one of the two chambers resulting from the provision of the partition 11, the usual waste 12 being also arranged within the said forward chamber. The partition 11 is formed with an opening 13 which is in alinement with the opening 9 and it will be observed that the journal 10 extends through the opening 13 and into the said forward chamber. It is within the rear one of the two chambers above mentioned that the packing embodying the present invention is arranged, and this packing will now be specifically described.

The packing above referred to includes among other elements a washer which as before stated, is designed to snugly fit the journal 10, immediately inwardly of the rear wall 8 of the box and this washer includes in its structure an annular core 14 which is in the nature of an endless spiral spring. A sheath 15 of cloth or other suitable material is woven about the core 14 as clearly shown in Fig. 3 of the drawing and constitutes the bearing surface of the washer.

In forming the washer above described, the annular core 14 is slightly expanded and the sheath 15 is then applied to the core. The finished washer is interiorly of a diameter less than the portion of the journal about which it is to fit; and in applying the washer to the journal the washer is expanded and, having a tendency to contract, will, when applied to the journal, snugly fit about the same. In order to accomplish the desired result, namely to prevent leakage of the lubricant from the box, the washer above described must bear snugly against the inner face of the rear wall 8 of the box at the opening 9 therein and in order that it may be at all times held in this position, a coil spring 16 is arranged upon the journal 10 and bears at one end against a metallic washer 17 and at its other end against that face of the partition 11 which is presented toward the inner face of the rear wall 8 of the box.

It will be observed from inspection of Fig. 1 of the drawing that the washer 17 loosely fits the journal 10 and that the point at which it engages against the packing washer is diametrically opposite the point of engagement of the packing washer against the inner face of the rear wall 8 so that the spring 16 bearing firmly against the washer 17, serves to at all times, hold the packing washer snugly and firmly against the rear wall of the box regardless of any endwise thrusts to which the journal 10 may be subjected.

Having thus described the invention what is claimed as new is:—

The combination with a journal box and journal, the box having a partition spaced from that wall through which the journal is projected, of a packing gasket encircling the journal and bearing against the inner face of that wall of the box through which the journal is projected, said gasket including a core consisting of an annular helical spring, and a sheaf of packing material covering the core, a washer loosely fitted on the journal and interposed between the gasket and the partition, a helical spring loosely wound around the journal and bearing at one terminal against the partition wall and at its opposite terminal against the washer for yieldably urging the washer against the gasket, whereby the gasket is yieldably held into engagement with the inner face of that wall of the box through which the journal is projected, the convolutions of the last-mentioned spring being disposed at right angles to the convolutions of the gasket spring.

In testimony whereof I affix my signature in presence of two witnesses.

FREDRICK A. ROBERTS. [L. S.]

Witnesses:
   FRED A. MAY,
   GERTRUDE MAY.

---

Copies of this patent may be obtained for five cents each, by addressing the "Commissioner of Patents, Washington, D. C."